(12) United States Patent
Ni et al.

(10) Patent No.: US 12,554,458 B2
(45) Date of Patent: Feb. 17, 2026

(54) METHOD AND APPARATUS FOR AUDIO PROCESSING, ELECTRONIC DEVICE AND STORAGE MEDIUM

(71) Applicant: BEIJING XIAOMI MOBILE SOFTWARE CO., LTD., Beijing (CN)

(72) Inventors: Jing Ni, Beijing (CN); Shanshan Liu, Beijing (CN); Xiaofei Jing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 154 days.

(21) Appl. No.: 18/660,094

(22) Filed: May 9, 2024

(65) Prior Publication Data

US 2025/0138773 A1    May 1, 2025

(30) Foreign Application Priority Data

Oct. 26, 2023   (CN) .......................... 202311403307.1

(51) Int. Cl.
    *G06F 3/16* (2006.01)
(52) U.S. Cl.
    CPC .................................. *G06F 3/162* (2013.01)
(58) Field of Classification Search
    CPC ..... G06F 3/162; G06F 3/165; H04R 2420/05; H04R 1/1041; H04M 1/6066; H04M 1/72412; H04M 1/72; H04W 76/14; H04W 76/11; H04W 76/20
    See application file for complete search history.

(56) References Cited

U.S. PATENT DOCUMENTS

| 11,689,655 | B2* | 6/2023 | Feng ................. H04M 1/72454 |
| | | | 381/104 |
| 2021/0377663 | A1* | 12/2021 | Carrigan ................. H04L 65/75 |
| 2024/0402980 | A1* | 12/2024 | Deep .................... H04N 21/439 |

FOREIGN PATENT DOCUMENTS

CN    111601199 A    8/2020

OTHER PUBLICATIONS

European Patent Application No. 24177722.6 Search Report dated Nov. 6, 2024, 11 pages.
Chinese Patent Application No. 202311403307.1, Office Action with English translation dated Sep. 10, 2025, 19 pages.

* cited by examiner

*Primary Examiner* — Phung-Hoang J Nguyen
(74) *Attorney, Agent, or Firm* — Cozen O'Connor (57) ABSTRACT

A method for audio processing, applicable to a first terminal device, includes: determining whether a target audio playing device to be connected exists in response to a monitored audio event, in which the target audio playing device has a connection with a second terminal device, and the second terminal device and the first terminal device have identical account information; in response to an existence of the target audio mode playing device to be connected, setting, according to the monitored audio event, a first audio mode of the first terminal device; establishing a connection with the target audio playing device, and disconnecting the connection between the target audio playing device and the second terminal device; and adjusting the first audio mode of the first terminal device to a second audio mode, and sending audio of the target audio event to the target audio playing device.

18 Claims, 5 Drawing Sheets

--- determine whether a target audio playing device to be connected exists in response to a monitored audio event — 101 in response to determining that the target audio playing device to be connected exists, set the first terminal device to a first audio mode according to the monitored audio event — 102 establish a connection is with the target audio playing device, and disconnect the connection between the target audio playing device and the second terminal device — 103 adjust the first audio mode of the first terminal device to a second audio mode, and send audio of the target audio event to the target audio playing device. — 104

METHOD AND APPARATUS FOR AUDIO PROCESSING, ELECTRONIC DEVICE AND STORAGE MEDIUM

CROSS-REFERENCE TO RELATED APPLICATIONS

The present application claims the benefit of priority to Chinese Application No. 202311403307.1, filed on Oct. 26, 2023, the contents of which are incorporated herein by reference in their entireties for all purposes.

BACKGROUND

A plurality of devices supporting an identical account may be connected to a same wireless earphone, so that the wireless earphone may be switched between the plurality of terminal devices supporting the identical account with a service platform such as a cloud platform that provides services to users who have established an account with the cloud platform. A user may prefer to access the cloud platform from more than one device.

SUMMARY

The present disclosure relates to the field of audio processing, and in particular to a method and an apparatus for audio processing, an electronic device and a storage medium.

Embodiments of a first aspect of the present disclosure propose a method for audio processing, which is applicable to a first terminal device and includes: determining whether a target audio playing device to be connected exists in response to a monitored audio event, in which the target audio playing device has a connection with a second terminal device, and the second terminal device and the first terminal device have identical account information; in response to an existence of a target audio playing device to be connected, setting, according to the monitored audio event, the first terminal device to a first audio mode; establishing a connection with the target audio playing device, and disconnecting the connection between the target audio playing device and the second terminal device; and adjusting the first audio mode of the first terminal device to a second audio mode, and sending audio of the target audio event to the target audio playing device.

Embodiments of a second aspect of the present disclosure propose a method for audio processing, which is applicable to a second terminal device and includes: determining whether currently played audio is in an earpiece playing mode in response to monitoring a first information broadcast by a the first terminal device; in which the first information is configured to indicate that a target audio playing device connected with the second terminal device is connected with the first terminal device, and the second terminal device and the first terminal device have identical account information; in which the first information is broadcast by the first terminal device in a condition that the first terminal device determines whether the target audio playing device to be connected exists in response to a monitored audio event, in response to an existence of the target audio playing device to be connected, the first terminal device is set to a first audio mode according to the monitored audio event, a connection is established with the target audio playing device, and the connection between the target audio playing device and the second terminal device is disconnected, and the first audio mode of the first terminal device is adjusted to a second audio mode, and audio of the target audio event is sent to the target audio playing device; and controlling the second terminal device to switch from the earpiece playing mode to a mute playing mode in response to the currently played audio being in the earpiece playing mode.

Embodiments of a third aspect of the present disclosure propose an apparatus for audio mode processing, which is applicable to a first terminal device, and includes: a determination module configured to determine whether a target audio playing device to be connected exists in response to a monitored audio event, in which the target audio playing device has a connection with a second terminal device, and the second terminal device and the first terminal device have identical account information; a setting module configured to set the first terminal device to a first audio mode according to the monitored audio event in response to an existence of the target audio playing device to be connected; an establishment module configured to establish a connection with the target audio playing device and disconnect the connection between the target audio playing device and the second terminal device; and an adjustment module configured to adjust the first audio mode of the first terminal device to a second audio mode, and send audio of the target audio event to the target audio playing device.

Embodiments of a fourth aspect of the present disclosure propose an electronic device, which includes a memory, a processor and a computer program stored on the memory and executable on the processor. The program, when executed by the processor, realizes a method described in the first aspect or a method described in the second aspect.

Embodiments of a fifth aspect of the present disclosure propose a non-transitory computer-readable storage medium, on which a computer program is stored, and the computer program, when executed by a processor, realizes a method described in the first aspect or a method described in the second aspect.

BRIEF DESCRIPTION OF THE DRAWINGS

The above and/or additional aspects and advantages of the present disclosure will be apparent and easily understood from the following description of embodiments taken in conjunction with the accompanying drawings, in which.

DETAILED DESCRIPTION

Embodiments of the present disclosure will be described in detail below, examples of which are illustrated in the accompanying drawings, and the same or similar reference numerals indicate the same or similar elements or elements having the same or similar functions throughout. The embodiments described below by referring to the attached drawings are exemplary and are intended to explain the present disclosure, but not to be construed as limitations of the present disclosure.

However, in a scenario where the wireless earphone is switched between the plurality of devices, how to adjust an audio mode of each device in order to reduce the user's operation and improve the intelligence of audio switching is an urgent technical problem to be solved.

A method and an apparatus for audio processing, an electronic device and a storage medium of embodiments of the present disclosure are described below with reference to the attached drawings.

Figure 1:
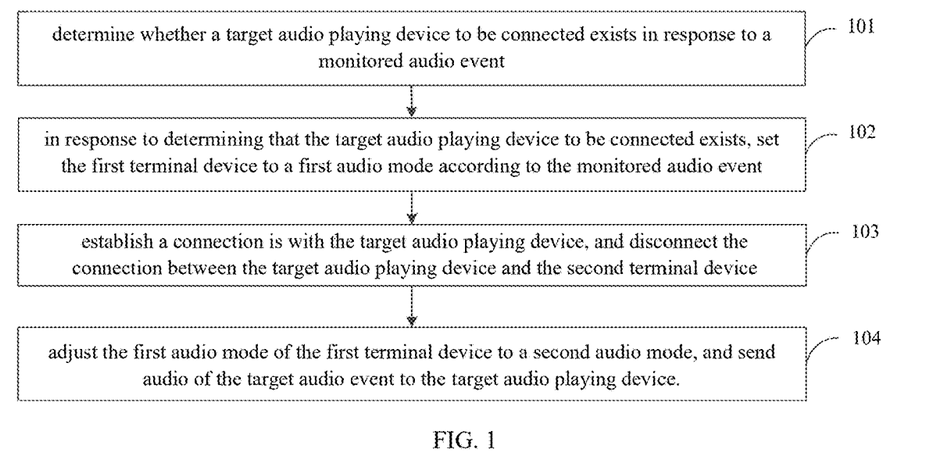
FIG. 1 is a flow chart of a method for audio processing provided by an embodiment of the present disclosure.

FIG. 1 is a flow chart of a method for audio processing provided by an embodiment of the present disclosure.

The execution subject of the method for audio processing in embodiments of the present disclosure is an apparatus for audio processing, which may be arranged in a first terminal device. The first terminal device may be a smart phone, a smart watch, a Pad, etc., which is not limited in the embodiment.

As shown in FIG. 1, the method may include the following steps.

At step 101, it is determined whether a target audio playing device to be connected exists in response to a monitored audio event.

The target audio playing device has a connection with a second terminal device, and the second terminal device and the first terminal device have identical account information.

The first terminal device and the second terminal device have the identical account information, which is the account information of login service platform. That is to say, the first terminal device and the second terminal device may use the identical account to log into the service platform, such as a cloud service platform, to obtain a corresponding service. As an example, taking an Apple device for example, a mobile phone and a Pad have the identical account A*ID, which is a login account of cloud storage. A plurality of devices having the identical account information may be connected with a same audio playing device, and e.g., the audio playing device is a Bluetooth earphone.

In an actual scenario, the user may have at least one audio playing device, and the at least one audio playing device may be connected with other devices having the identical account. The target audio playing device to be connected determined by the first terminal device is one of the at least one audio playing device. For the target audio playing device to be connected, the target audio playing device is connected with the second terminal device and is in a wearing state, and the priority of an audio corresponding to the audio event of the first terminal device is higher than the priority of a currently played audio of the target audio playing device, meeting the condition of audio switching, so that the first terminal device may connect with the target audio playing device and play the audio corresponding to the audio event by using the target audio playing device. The second terminal device is a device that has established a connection with the target audio playing device. The second terminal device may be a smart phone, a smart watch, a Pad, a tablet computer, a notebook computer, a projection device, smart glasses, etc., which is not limited in the embodiment.

As an example, the user has two devices, in which one device is a mobile phone and the other device is a Pad, and the user has a Bluetooth earphone. The first terminal device is the Pad, the second terminal device is the mobile phone, and the Bluetooth earphone has established a connection with the mobile phone. In some examples, the Bluetooth earphone is not playing any music, or the Bluetooth earphone is playing the audio of the mobile phone, and the volume is greater than 0.

As an implementation of determining a target audio playing device to be connected, state information of at least one audio playing device to be screened is acquired, in which the audio playing device to be screened is a directly connectable audio playing device prestored by each terminal device and may be connected with the first terminal device and the second terminal device; according to the state information of each audio playing device and priority of the audio event, it is determined whether an audio playing device meeting a condition of audio switching exists; a target audio playing device is determined from the audio playing device meeting the condition of audio switching in response to an existence of the audio playing device meeting the condition of audio switching; and in response to an absence of the audio playing device meeting the condition of audio switching, it is determined that no target audio playing device to be connected exists.

The state information of at least one audio playing device to be screened may be determined from current state information of at least one audio playing device stored in a setting list, or broadcast information of at least one audio playing device may be obtained by searching, and the current state information of at least one candidate audio playing device may be obtained by parsing. The state information of an earphone includes a wearing state, an audio state and an audio focus state of the earphone. The wearing state indicates whether a corresponding earphone is in a wearing state; the audio status indicates whether the corresponding earphone is playing audio; and the audio focus state indicates which application the audio played by the corresponding earphone belongs to, to identify whether an audio type is a call type or a media type. The type of audio may be configured to indicate the priority of audio, and different types of audio have different priorities when playing.

At step 102, in response to determining that the target audio playing device to be connected exists, the first terminal device is set to a first audio mode according to the monitored audio event.

In embodiments of the present disclosure, the first terminal device monitors the audio event, and the audio event indicates the audio and the audio type to be played by the first terminal device. The audio type includes voice audio and media audio. The voice audio includes voice audio of ordinary phone call and voice audio of voice calls of three-party application software (for example, voice call or voice video of instant messaging software). The media audio includes music, video and live audio. When the first terminal device monitors the audio event and determines that a target audio playing device to be connected based on the audio event exists, an audio mode corresponding to the first terminal device may be set according to the monitored audio event. The audio mode includes a first audio mode and a second audio mode, and the first audio mode and the second audio mode may be the same or different. When the monitored audio events are different, the first audio mode and the second audio mode set by the first terminal device are also different, and the specific will be described based on different audio events in the following.

At step 103, a connection is with the target audio playing device is established, and the connection between the target audio playing device and the second terminal device is disconnected.

In an implementation of embodiments of the present disclosure, if the first terminal device and the target audio playing device have been paired, the first terminal device may directly call the target audio playing device according to an address and pairing password of the target audio playing device, establish a connection with the target audio playing device, and disconnect the connection between the target audio playing device and the second terminal device, thus realizing that the first terminal device preempt to connect with the target audio playing device which has been connected with the second terminal device, and realizing the automatic switching of the terminal device connected with the target audio playing device.

In a second implementation of embodiments of the present disclosure, if the first terminal device and the target audio playing device are not paired, the user may be guided through an user interface of the first terminal device to long pressing the target audio playing device to enter a paring mode, thus completing a pairing process of the first terminal device and the target audio playing device, and establishing the connection between the first terminal device and the target audio playing device after the pairing is completed and disconnecting the connection between the target audio playing device and the second terminal device. Thus, it is realized that the first terminal device preempts to connect with the target audio playing device which has been connected with the second terminal device, to avoid user operation, realize automatic switching of the terminal device connected with the target audio playing device, realize consistency among multiple devices, and cover more scenarios.

In a third implementation of embodiments of the present disclosure, if the first terminal device and the target audio playing device are not paired, then the first terminal device is paired and connected with the target audio playing device. Specifically, based on an identical account's quick connection protocol, the first terminal device may identify the target audio playing device belonging to the user, that is, the target audio playing device that may be connected with the identical account devices. Further, the pairing process between the first terminal device and the target audio playing device is completed through the quick connection protocol, without guiding the user to long press the target audio playing device to enter the pairing mode, thus avoiding the user's operation, and connection is completed after the pairing, realizing the consistency among multiple devices and covering more scenarios.

It should be understood that the quick connection protocol may be customized by the manufacturer, and define the data format and content that the target audio playing device needs to follow when sending broadcast data and connection data to the terminal device, to identify whether the connection may be established and the data of the target audio playing device may be stored.

At Step 104, the first audio mode of the first terminal device is adjusted to a second audio mode, and the audio of the target audio event is sent to the target audio playing device.

In embodiments of the present disclosure, when the first terminal device establishes a connection with the target audio playing device, the first audio mode set by the first terminal device is adjusted to the second audio mode, so that the audio of the audio event is played in different audio modes before and after the first terminal device is connected with the target audio playing device, and the audio corresponding to the audio event is sent to the target audio playing device through Bluetooth, to play the audio through the target audio playing device. Thus, the audio mode of the first terminal device is automatically set and adjusted, to meet the audio play requirements of the user in various scenarios, and improve intelligence and user experience.

In the method for audio processing of embodiments of the present disclosure, in response to the monitored audio event, it is determined whether a target audio playing device to be connected exists, in which the target audio playing device establishes a connection with a second terminal device, and the second terminal device and the first terminal device have identical account information; in response to determining that the target audio playing device to be connected exists, the first terminal device is set to the first audio mode according to the monitored audio event; a connection with the target audio playing device is established, and the connection between the target audio playing device and the second terminal device is disconnected; and the first audio mode of the first terminal device is adjusted to the second audio mode, and the audio of the target audio event is sent to the target audio playing device. Thus when it is determined that the target audio playing device capable of performing audio switching exists, the target audio playing device is connected, and the audio mode of the first terminal device is automatically set and adjusted according to the monitored audio event, to meet the audio play requirements of the user in various scenarios and improve intelligence and user experience.

Based on the above-mentioned embodiments, embodiments of the present disclosure explain how to set the audio mode in different scenarios to meet the audio playing requirements in different scenarios, and details are as follows.

In a scenario, the audio type of audio events is a call type, such as voice call, video call and ordinary phone call. In order to prevent the user from missing call information, in response to determining that a target audio playing device to be connected exists, the first audio mode of the first terminal device is set to a speaker playing mode according to the monitored audio event, and the speaker playing mode means that the first terminal device plays a voice through the speaker. That is, the first terminal device may play ringing prompt audio of the call to remind the user to prepare for answering, avoiding missing the phone call information. Further, the connection with the target audio playing device is established, and in response to establishment of the connection with the target audio playing device, the audio mode corresponding to the first terminal device is adjusted from the speaker playing mode to an earpiece playing mode. The earpiece playing mode means that the first terminal may play voice through the target audio playing device. Therefore, after the audio event is sent to the target audio playing device, it may be played through the target audio playing device, to realize that the first audio mode of the first terminal device is set to the speaker playing mode under the condition that the first terminal device monitors that the audio type corresponding to the audio event is the call type, so that the user may know an incoming call in advance in a call scenario, such as an ordinary phone call or a voice or video call of a third-party application, to ensure that the user will not miss the call due to the abnormal situations in an audio streaming process, and when the target audio playing device is connected, the earpiece mode is set to adopt the target audio playing device to play, to meet the playing requirements in different scenarios.

In another scenario, the audio type of the audio event is a multimedia type. The multimedia type includes music, video, live broadcast and other audio, and audio playing with a speaker of the first terminal device will usually create environmental noise. Therefore, in response to determining that a target audio playing device to be connected exists, the audio mode corresponding to the first terminal device is set to a mute playing mode according to the monitored audio event. The mute playing mode means that the voice of the audio event is still playing, but the first terminal device does not emit sound. Furthermore, a connection with the target audio playing device is established, and in response to establishment of the connection with the target audio playing device, the audio mode corresponding to the first terminal device is switched from the mute playing mode to the earpiece playing mode, so that the target audio playing device connected with the first terminal device may play the audio corresponding to the audio event, that is to say, the target audio playing device is automatically switched from playing the audio of the second terminal device to playing the audio of the first terminal device, to realize that the audio mode of terminal device may be set and switched when different devices are connected to the target audio to playing device, that is, in the process of audio streaming, to meet the requirements of the user in different scenarios and be more intelligent.

Figure 2:
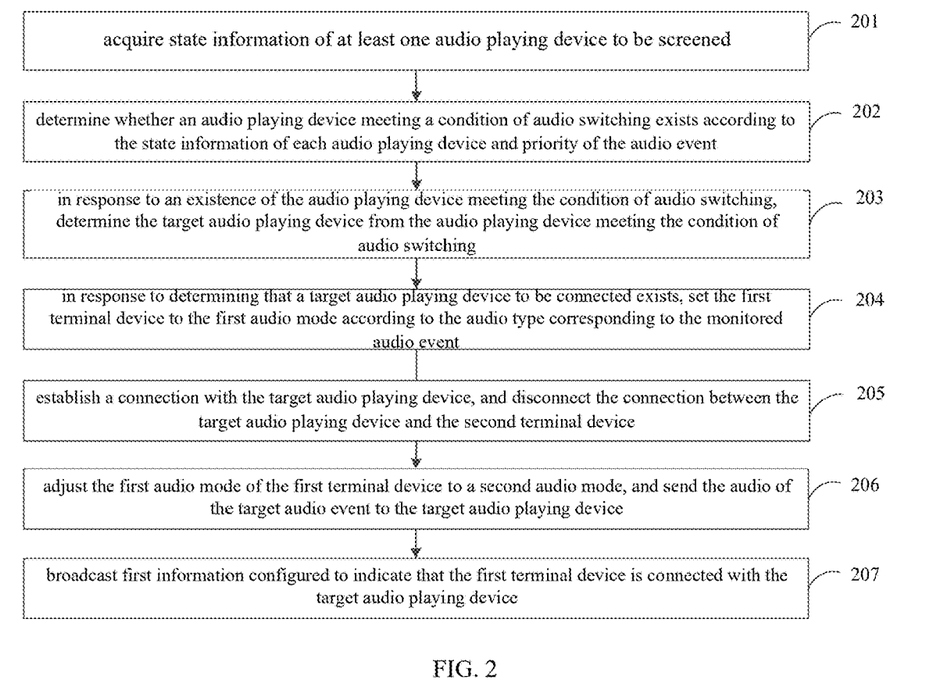
FIG. 2 is a flow chart of another method for audio processing provided by an embodiment of the present disclosure.

Based on the above embodiment, FIG. 2 is a flow chart of another audio mode processing method provided by embodiments of the present disclosure. As shown in FIG. 2, the method includes the following steps.

At step 201, the state information of at least one audio playing device to be screened is acquired.

As an implementation, the state information of each audio playing device is determined based on information broadcast by each audio playing device.

In embodiments of the present disclosure, the state information of at least one audio playing device to be screened stored in the setting list is to be explained, and the audio playing device to be screened is a directly connectable audio playing device prestored by each terminal device. For example, the audio playing device is a Bluetooth earphone, if the user has two Bluetooth earphones, the setting list including the state information of the two Bluetooth earphones is stored in the user's mobile phone, and the state information of the Bluetooth earphone may be determined based on the information broadcast by each Bluetooth earphone or in response to a user operation input. The first terminal device maintains a setting list, and the setting list stores the state information of the Bluetooth earphone that may be automatically switched to, that is, the state information of the earphone that may be automatically connected. The state information of each Bluetooth earphone in the setting list is updated regularly, and the frequency of updating is the same as the frequency of broadcasting information of each Bluetooth earphone. That is to say, each Bluetooth earphone may broadcast its own state message through Bluetooth according to the set period, which meets the requirements of the quick connection protocol.

The state information of the earphone includes a wearing state, an audio state and an audio focus state of the earphone. The wearing state indicates whether the corresponding earphone is in a wearing state; the audio status indicates whether the corresponding earphone is playing audio; and the audio focus state indicates which application the audio played by the corresponding earphone belongs to, to identify whether the audio type is a call type or a media type.

At step 202, according to the state information of each audio playing device and the priority of the audio event, it is determined whether an audio playing device meeting the condition of audio switching exists.

The audio event includes a phone call event, a voice call event, a video call event and a media audio play event. Therefore, the corresponding audio includes phone call audio, voice call audio, video call audio and media audio (music, video, etc.). The audio priority may be set in advance. Usually, the audio priority is set as follows.

Priority of phone call audio=priority of voice call audio=priority of video call audio>priority of media audio>priority of no audio.

No audio means that the audio playing device is connected with one device of the identical account devices, but no audio data is played, so the priority is the lowest.

In embodiments of the present disclosure, for the state information of each audio playing device, the first terminal device determines whether the audio playing device is in a wearing state according to the wearing state in the state information of the audio playing device, that is, whether the user is currently using the audio playing device. When the audio playing device is in the wearing state, it is determined whether the audio playing device is currently playing the audio of an application program according to the audio state and the audio focus state. If no audio is played, it is determined that the audio priority is the lowest, and if the audio is played, the audio type is determined according to the application program corresponding to the audio, thereby determining the corresponding audio priority. The audio priority of the audio played by the audio playing device is compared with the audio priority corresponding to the audio event, to determine whether the audio priority of the audio played by the audio playing device is less than or equal to the audio priority corresponding to the audio event. If the audio priority of the audio played by the audio playing device is less than or equal to the audio priority corresponding to the audio event, and the audio played by the audio playing device is not a call audio and the audio event is not a call audio, then it is determined that an audio playing device meeting the condition of audio switching exists, and the first terminal device may connect with the audio playing device, to play the audio event through the audio playing device, and realize the switching of audio data played by the audio playing device.

At step 203, in response to the existence of an audio playing device meeting the condition of audio switching, the target audio playing device is determined from the audio playing device meeting the condition of audio switching.

In embodiments of the present disclosure, because a plurality of audio playing devices that may be automatically switched or connected exists in the setting list, a situation that a plurality of audio playing devices meets the condition of audio switching exists. As an implementation, the audio playing device corresponding to the recently received broadcast information may be used as the target audio playing device according to a time sequence of receiving the broadcast information of each audio playing device meeting the condition of audio switching.

As another implementation, the audio playing device corresponding to the firstly received broadcast information may be determined as the target audio playing device according to the time information of receiving the broadcast information of each audio playing device meeting the condition of audio switching.

As another implementation, the audio playing device with the lowest audio priority may be determined according to the priority of the audio of the second terminal device played by each audio playing device meeting the condition of audio switching, and the audio playing device may be used as the target audio playing device to be connected by the first terminal device, that is, the audio playing device may be used as the target audio playing device to be preempted to be connected by the first terminal device, to realize automatic audio streaming without an user operation, which is more convenient and intelligent.

As an example, the first terminal device is a Pad, and the second terminals device includes two devices, namely, a mobile phone 1 and a mobile phone 2. The audio playing device is an earphone, and two pairs of earphones are playing audio. Earphone 1 is playing the call audio of the mobile phone 1, and earphone 2 is playing the media audio of the mobile phone 2. The audio event monitored by the Pad is the call audio, so the Pad will preempt to connect with the pair of earphones that are playing the media audio, because the priority of the media audio is lower than the priority of the call audio. If two pair of earphones are playing media audio, then the Pad will preempt to connect with earphone 1 first when the pad firstly received the broadcast information of earphone 1, or the Pad will preempt to connect with the earphone 2, when the Pad last received the broadcast information of earphone 2, that is, earphone 2 is still updating the earphone state information regularly, so that earphone 2 must be in a connected stated, to improve the reliability of the connection.

In some examples, in response to the absence of an audio playing device meeting the condition of audio switching, it is determined that no target audio playing device to be connected exists, so that any audio playing device cannot be connected.

At step 204, in response to determining that a target audio playing device to be connected exists, the first terminal device is set to the first audio mode according to the audio type corresponding to the monitored audio event.

The target audio playing device is connected with a second terminal device of a plurality of devices.

At step 205, a connection with the target audio playing device is established, and the connection between the target audio playing device and the second terminal device is disconnected.

At step 206, the first audio mode of the first terminal device is adjusted to a second audio mode, and the audio of the target audio event is sent to the target audio playing device.

Steps 204-206 may refer to the explanation in the previous embodiment with the same principle, which are not repeated here.

At step 207, the first information is broadcast, and the first information is configured to indicate that the first terminal device is connected with the target audio playing device.

In embodiments of the present disclosure, under the condition that the first terminal device establishes a connection with the target audio playing device and controls the target audio playing device to play the audio corresponding to the audio event, the first information is broadcast, so that the second terminal device determines that the target audio playing device has been preempted to be connected by the first terminal device according to the first information in condition that the second terminal device has searched the first information broadcast by the first terminal device, to clarify that because the voice of the first terminal device with higher priority will use the target audio playing device, the second terminal device is disconnected from the target audio playing device, to prevent the second terminal device from connecting the target audio playing device again. Instead, the audio mode of its own device is automatically adjusted when the target audio playing device is disconnected, which improves the user experience.

In the method for audio mode processing of embodiments of the present disclosure, the first terminal device automatically sets and adjusts the audio mode of the first terminal device according to the audio type corresponding to the monitored audio event, so that the audio mode processing process is automatically carried out under the condition that a plurality of terminal devices in the identical account information preempt to connect with the audio playing device; which requires low computing power for the audio playing device, is applicable to more audio playing devices, meets the audio playing requirements of the user in various scenarios, and improve the intelligence and the user experience.

Based on the above embodiments, in an implementation of embodiments of the present disclosure, prompt information is displayed in an interactive interface of the first terminal device, and the prompt information is configured to indicate a connection state of the first terminal device and the target audio playing device. Specifically, the prompt information may be displayed through the interactive interface of the first terminal device during the process of establishing the connection between the first terminal device and the target audio playing device, and the prompt information is configured to prompt the user that the connection state of the first terminal device and the target audio playing device of the user is being connected. Furthermore, when the connection is completed, the displayed prompt information is configured to prompt the user that the connection state of the first terminal device and the target audio playing device of the user is that the connection is completed.

Figure 3:
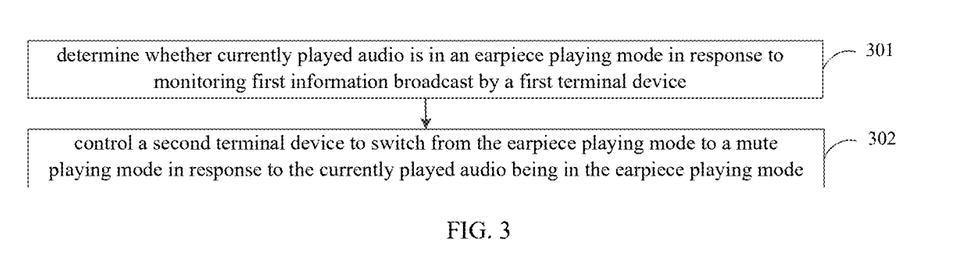
FIG. 3 is a flow chart of another method for audio processing provided by an embodiment of the present disclosure.

Based on the above embodiments, embodiments of the present disclosure provide another method for audio mode processing, and FIG. 3 is a flow diagram of another method for audio mode processing provided by embodiments of the present disclosure. As shown in FIG. 3, the method includes the following steps.

At step 301, in response to monitoring the first information broadcast by the first terminal device, it is determined whether the currently played audio is in the earpiece playing mode.

The execution subject of this embodiment of the present disclosure is the second terminal device. The second terminal device and the first terminal device have the identical account information and may be connected to the same target audio playing device. At present, the target audio playing device connected to the second terminal device is preempted to be connected by the first terminal device. The second terminal device may be a smart phone, a smart watch, a Pad, a tablet computer, a notebook computer, a projection device, smart glasses, etc., which is not limited in this embodiment.

The first information is broadcast by the first terminal device in a condition that the first terminal device sets the first audio mode corresponding to the first terminal device according to the monitored audio event in response to the existence of the target audio playing device to be connected; establishes a connection with the target audio playing device, and disconnects the connection between the target audio playing device and the second terminal device, adjusts the first audio mode of the first terminal device to a second audio mode, and sends the audio of the target audio event to the target audio playing device. The first information is configured to indicate that the target audio playing device originally connected with the second terminal device has now established a connection with the first terminal device.

The relevant explanations about the first information in the previous embodiment and other explanations related to this embodiment are also applicable to this embodiment, which will not be repeated here.

In this embodiment, the second terminal device is a terminal device connected with the target audio playing device before the first terminal device is connected with the target audio playing device.

At step 302, in response to the currently played audio being in the earpiece playing mode, the second terminal device is controlled to switch from the earpiece playing mode to the mute playing mode.

In this embodiment of the present disclosure, when the second terminal device determines that the target audio playing device has been connected with the first terminal device according to the first information, it will be determined whether the second terminal device currently has audio being played. If there is audio being played, because the target audio playing device has been disconnected, the second terminal device is controlled to switch from the earpiece playing mode to the mute playing mode. That is, the second terminal device does not adopt the earpiece playing mode for voice playing, to avoid environmental noise interference or realize user privacy protection.

In the method for audio mode processing of embodiments of the present disclosure, in response to monitoring the first information broadcast by the first terminal device, it is determined whether the currently played audio is in the earpiece playing mode, and in response to the currently played audio being in the earpiece playing mode, the second terminal device is controlled to switch from the earpiece playing mode to the mute playing mode. In the scenario of connecting with the identical account, when the connected target audio playing device is preempted, the second terminal device of the plurality of terminal devices may judge whether it is necessary to set the second terminal device to the mute playing mode of the voice according to whether the audio is still in the earpiece playing mode at this time. This process is also automatically triggered, which reduces the manual pause or mute by the user, improves the intelligence and achieves the purpose of improving the user experience.

Based on the above embodiment, in an implementation of embodiments of the present disclosure, prior to determining whether the currently played audio is in the playing state in response to monitoring the first information broadcast by the first terminal device, the method further includes: acquiring the earphone preemption information sent by the connected target audio playing device, in which the earphone preemption information is configured to indicate that the target audio playing device is being connected with the first terminal device, to inform the second terminal device that the target audio playing device is being preempted by the first terminal device through an AT instruction during the process of the target audio playing device being connected with the first terminal device, to remind the user using the target audio playing device to play the audio in the second terminal device, thus improving the user experience.

In an implementation of embodiments of the present disclosure, after the second terminal device is disconnected from the audio playing device, and the second terminal device is controlled to switch from the earpiece playing mode to the mute playing mode in response to the currently played audio being in the earpiece playing mode, the method further includes: displaying prompt information on the interactive interface of the second terminal device; in which the prompt information is configured to indicate that the target audio playing device connected with the second terminal device has been connected with the first terminal device, to prompt the user that the target audio playing device has been connected with other terminals device, so that the user may understand the reason for disconnecting from the target audio playing device, improving the user experience.

Based on the above embodiment, as an implementation, in response to detecting the target operation on the second terminal device, the second terminal device is controlled to switch from the mute playing mode to the speaker playing mode. In this embodiment of the present disclosure, if the user wants to continue playing the original audio after learning that the target audio playing device has been preempted by other devices, the user may click a target button of the second terminal device, such as a power button, to make the second terminal device turn on or off a screen, or the user manually increases or decreases the volume or changes the audio playing state, then the second terminal device cancels the mute playing mode and switches to the speaker playing mode.

Figure 4:
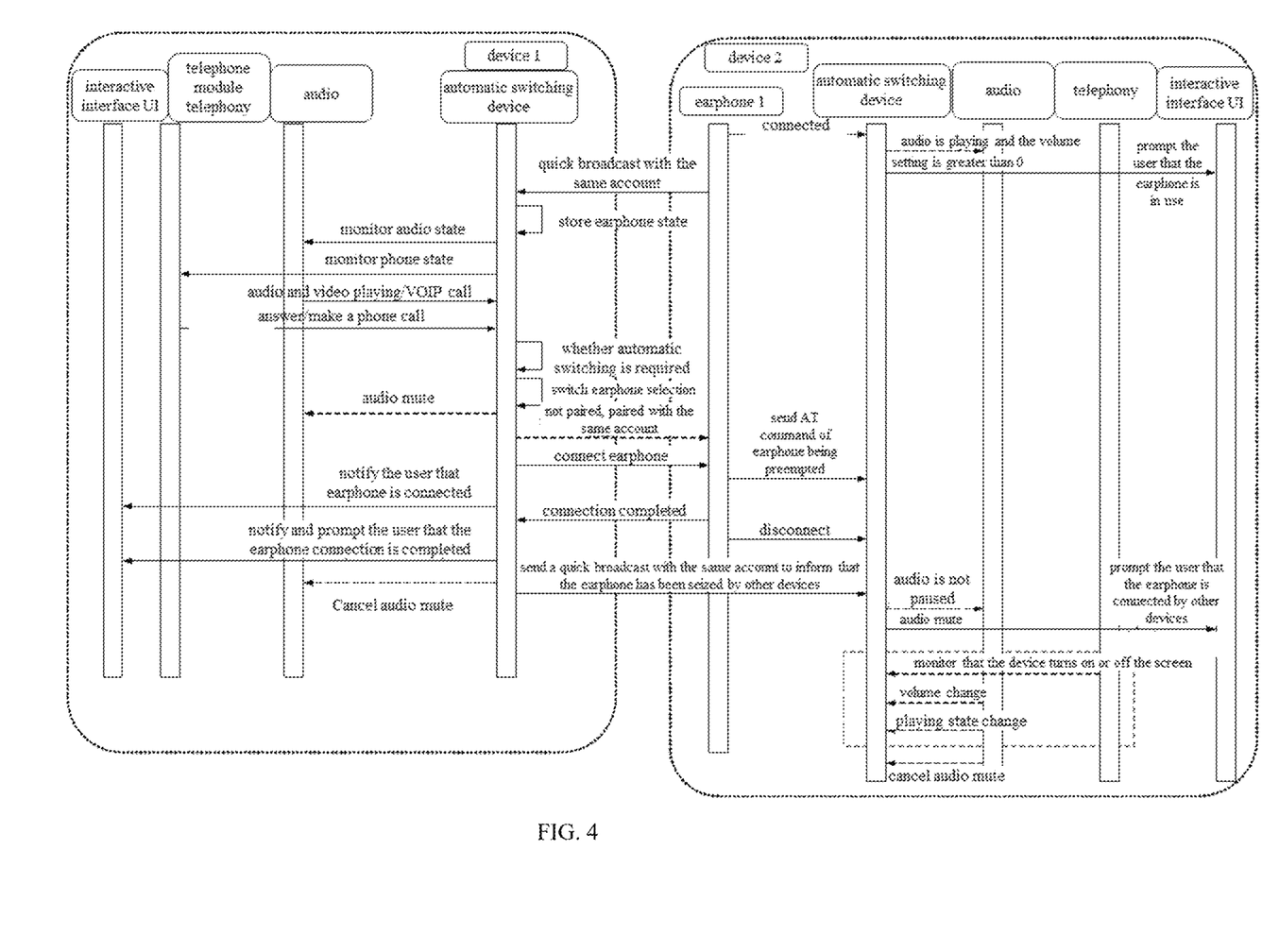
FIG. 4 is a flow chart of an interactive method for audio processing provided by an embodiment of the present disclosure.

Based on the above embodiments, embodiments of the present disclosure provide an interactive method for audio processing. FIG. 4 is a flow chart of an interactive method for audio mode processing provided in embodiments of the present disclosure. In embodiments of the present disclosure, taking an example that the target audio playing device is an earphone for explanation, as shown in FIG. 4, the method includes the following.

In this embodiment of the present disclosure, there are two terminals device with the identical account information, which are called device 1 and device 2 respectively, and there is one connectable earphone, which called earphone 1.

(1) Device 2 is connected to earphone 1 and playing audio, and the volume value is greater than 0.

(2) Earphone 1 sends broadcast information periodically, that is, quick connection broadcast with the identical account. Device 1 receives the broadcast information, parses the broadcast information, and acquires the state information of earphone 1, including the wearing state, the audio state, the audio focus state and other information, and uses this earphone 1 as an automatic switching earphone, and stores the state information of earphone 1 in the earphone list.

(3) Device 1 monitors the audio event, and the audio event may be audio and video play/voice VOIP call, or ordinary phone call.

(4) Device 1 receives the audio event, and checks whether there is a connected earphone. If there are no earphones connected, device 1 queries the earphone list to determine whether there is an earphone meeting the condition of audio switching. The condition of audio switching is that: the switching may only be performed if the earphone is worn on both ears and the audio priority meets the condition, that is, the condition of audio switching may be met only when the audio monitored by device 1 and the audio played by device 1 are not call audio at the same time, and the audio priority currently played by the earphone is less than or equal to the audio priority of device. The audio priority is as follows: phone call=VOIP>audio=video>None. If an earphone that meets the condition of audio switching exists, this earphone 1 is served as the target earphone to be connected. In embodiments of the present disclosure, for example, the audio event monitored by device 1 is the media audio, since the media audio played by device 1 is post-played, although the media audio to be played by device 1 and the media audio played by device 2 have the same priority, device 1 may be connected to the earphone 1, and the audio played by the earphone 1 may be switched according to the principle that the audio post-played has higher priority according to the principle that the audio post-played has higher priority.

It should be noted that in the case that the audio to be played by device 1 is the call audio, while the audio played by device 2 is also the call audio, it is necessary for the user to confirm before device 1 preempts to connect with the earphone 1.

The audio mode setting manner of device 2 in the process of preempting to connect with earphone 1 may refer to the description of different scenarios in the previous embodiments, which will not be described here again.

(5) If the earphone 1 is not paired with device 1, a pairing process with the identical account needs to be performed, and then device 1 will connect the earphone 1, otherwise the device 1 directly connects the earphone 1.

(6) When the device 1 connects the earphone 1, the earphone 1 sends an AT instruction to the device 2 to inform that the device 1 is preempting the earphone 1.

(7) After the connection of the device 1 is completed, the device 2 is disconnected, and the device 1 cancels the mute playing mode.

(8) The device 1 broadcasts the first information, that is, the quick connection broadcast with the identical account, informs device 2 that the earphone 1 has been preempted by device 1. The device 2 is first set to the mute playing mode (that is, audio mute) to stop playing the sound of the currently playing audio with the speaker, and then prompts the user that the earphone has been connected with other devices with the identical account in the interactive interface of device 2.

(9) On or off of a screen, volume change and play state change of the device are monitored, that is, device 2 detects that the target button is clicked. For example, when device 2 detects that that the power button is clicked to makes the screen of the second terminal device turn on or off, or the user manually increases or decreases the volume, or the user changes the audio play state, then device 2 cancels the mute playing mode and switches to the speaker play state, to continue playing the originally played audio by way of playing sound with the speaker, to avoid the interruption or pause of the originally played audio.

The relevant explanations and beneficial effects in the previous embodiment are also applicable to this embodiment, and the principle is the same, which are not repeated here.

Figure 5:
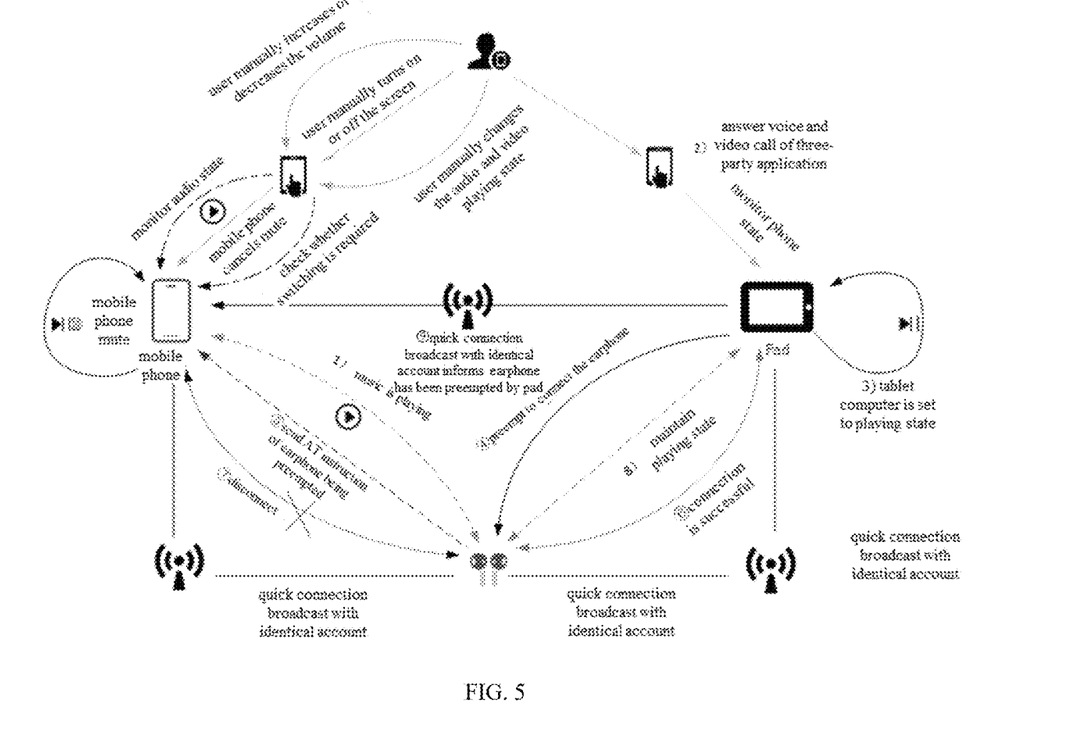
FIG. 5 is a schematic diagram of an interactive scenario of audio processing provided by an embodiment of the present disclosure.

Based on the above embodiment, FIG. 5 is a schematic diagram of an interactive scenario of audio mode processing provided by embodiments of the present disclosure. In embodiments of the present disclosure, taking an example that the target audio playing device is an earphone for explanation, as shown in FIG. 5, the method includes the followings.

As an example of a scenario, the first terminal device of a plurality of terminal devices with the identical device account is a tablet computer, and the second terminal device is a mobile phone, and the user only has one earphone. When the user uses the mobile phone to connect the earphone to play music, the tablet computer suddenly receives a voice call from a three-party application (such as WeChat, QQ, etc.), the audio processing process of the first terminal device and the second terminal device is specifically as follows.

1) The mobile phone is connected to the earphone and is playing music;

2) The tablet computer searches and finds the quick connection broadcast with the identical account sent by the earphone, the broadcast carries the state information of the earphone, and the tablet computer stores the state information of the earphone. The tablet computer receives the voice and video call of the three-party application, that is, the tablet computer monitors the call event. Since the audio priority of the music of the mobile phone played by the earphone is lower than the audio priority of the voice call of the tablet computer that preempt to connect with the earphone, the condition of audio switching is triggered. That is, the tablet computer may connect the earphone to play the audio of the voice call through the earphone.

3) The audio mode of the tablet computer is set to the speaker playing mode, so that the tablet computer may play a ringing sound of the voice call with the speaker to remind the user that there is a voice call.

4) The tablet computer receives the quick connection broadcast information with the identical account of the earphone, starts pairing, and preempts to connect with the earphone.

5) The earphone sends an AT instruction to the mobile phone, and the AT instruction carries the earphone preemption information to inform the mobile phone that the tablet computer is preempting the earphone.

6) The earphone is connected to the tablet computer successfully.

7) The earphone is disconnected from the mobile phone.

8) The tablet computer switches from the speaker playing mode to the earpiece playing mode, so that the earphone may play the sound of voice call.

9) The tablet computer broadcasts the first information, through quick connection broadcast with the identical account, to inform the mobile phone that the earphone has been preempted by the tablet computer.

10) The audio of the mobile phone is set to the mute state, that is, the mute playing mode.

11) The user turns on or off the screen manually, that is, clicking the target button of the second terminal device, such as the power button, to make the second terminal device turn on or off the screen, or the user manually increases or decreases the volume, or the user manually changes the audio/video playing state, then the second terminal device cancels the mute playing mode and switches to the speaker playing mode.

The relevant explanations and beneficial effects in the previous embodiment are also applicable to this embodiment, and the principle is the same, which will not be repeated here.

In order to realize the above embodiment, embodiments of the present disclosure also propose an apparatus for audio processing, which is applicable to the first terminal device.

Figure 6:
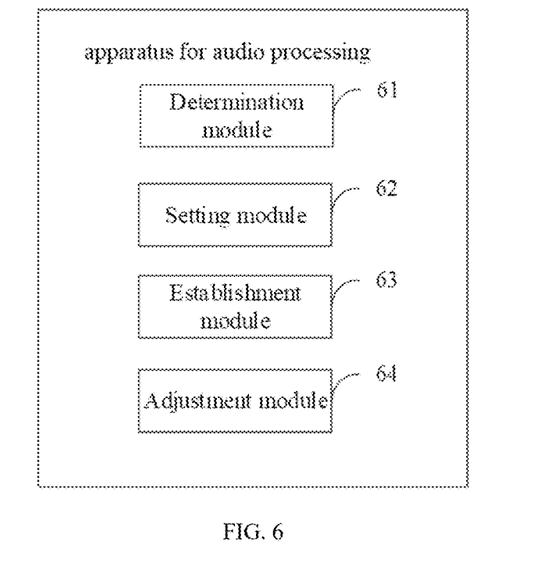
FIG. 6 is a schematic structural diagram of an apparatus for audio processing provided by an embodiment of the present disclosure.

FIG. 6 is a schematic structural diagram of an apparatus for audio mode processing provided by an embodiment of the present disclosure.

As shown in FIG. 6, the apparatus may include: a determination module 61 configured to determine whether a target audio playing device to be connected exists in response to a monitored audio event, in which the target audio playing device has a connection with a second terminal device, and the second terminal device and the first terminal device have identical account information; a setting module 62 configured to set the first terminal device to a first audio mode according to the monitored audio event in response to an existence of a target audio playing device to be connected; an establishment module 63 configured to establish a connection with the target audio playing device and disconnect the connection between the target audio playing device and the second terminal device; and an adjustment module 64 configured to adjust the first audio mode of the first terminal device to a second audio mode, and send audio of the target audio event to the target audio playing device.

Further, in an implementation of embodiments of the present disclosure, the determination module 61 is further configured to: acquire state information of at least one audio playing device to be screened; determine whether an audio playing device meeting a condition of audio switching exists according to the state information of each audio playing device and priority of the audio event; determine the target audio playing device from the audio playing device meeting the condition of audio switching in response to an existence of the audio playing device meeting the condition of audio switching; and determine that no target audio playing device to be connected exists in response to an absence of the audio playing device meeting the condition of audio switching.

In an implementation of embodiments of the present disclosure, the determination module 61 is further configured to search to obtain broadcast information of the at least one audio playing device, and parse current state information of the at least one candidate audio playing device.

In an implementation of embodiments of the present disclosure, the determination module 61 is further configured to acquire current state information of the at least one audio playing device stored in a setting list.

In an implementation of embodiments of the present disclosure, an audio type corresponding to the audio event is a call type, and the adjustment module 64 is further configured to: adjust a speaker playing mode corresponding to the first terminal device to an earpiece playing mode.

In an implementation of embodiments of the present disclosure, an audio type corresponding to the audio event is a multimedia type, and the adjustment module 64 is further configured to: adjust a mute playing mode corresponding to the first terminal device to an earpiece playing mode.

In an implementation of embodiments of the present disclosure, the apparatus further includes: a broadcasting module configured to broadcast first information; and the first information is configured to indicate that the first terminal device is connected with the target audio playing device.

In an implementation of embodiments of the present disclosure, the apparatus further includes: a display module configured to display prompt information in an interactive interface of the first terminal device.

In an implementation of embodiments of the present disclosure, the establishing module 63 is further configured to: pair and connect with the target audio playing device in response to detecting that the first terminal device is not paired with the target audio playing device.

In an implementation of embodiments of the present disclosure, the apparatus further includes: a determination module configured to acquire state information of each earphone stored in an earphone list in response to monitoring an audio event and detecting no earphone connected, in which the state information of each earphone is determined based on broadcast information periodically sent by each earphone; determine whether an earphone meeting a condition of audio switching exists, according to the state information of each earphone and audio priority corresponding to the audio event; and determine a target audio playing device from the earphone meeting the condition of audio switching in response to an existence of the earphone meeting the condition of audio switching.

It should be noted that the above explanation of the method embodiment is also applicable to the apparatus of this embodiment, which will not be repeated here.

In the apparatus for audio mode processing proposed by the present disclosure, in response to determining that a target audio playing device meeting the condition of audio switching exists, the audio mode of the first terminal device is set according to the monitored audio event, and the target audio playing device is connected with the second terminal device, a connection with the target audio playing device is established, and the audio mode of the first terminal device is adjusted from the first audio mode to the second audio mode, to control the target audio playing device to play the audio corresponding to the audio event. Thus, the audio mode of the first terminal device is automatically set and adjusted according to the monitored audio event in a scenario that the target audio playing device may be connected with any device of a plurality of terminal devices with the identical account, to meet the audio play requirements of the user in various scenarios and improve intelligence and user experience.

In order to realize the above embodiment, embodiments of the present disclosure also propose an apparatus for audio mode processing, which is applicable to the second terminal device.

Figure 7:
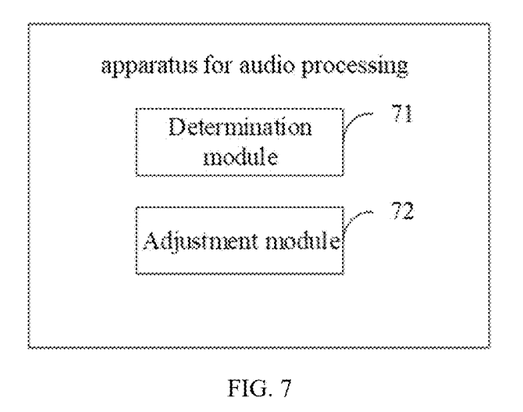
FIG. 7 is a schematic structural diagram of another apparatus for audio processing provided by an embodiment of the present disclosure.

FIG. 7 is a schematic structural diagram of an apparatus for audio mode processing provided by an embodiment of the present disclosure.

As shown in FIG. 7, the apparatus may include: a determination module 71 configured to determine whether currently played audio is in an earpiece playing mode in response to monitoring first information broadcast by the first terminal device, in which the first information is configured to indicate that the target audio playing device connected with the second terminal device establishes a connection with the first terminal device, and the second terminal device and the first terminal device have the identical account information; in which the first information is broadcast by the first terminal device in a condition that the first terminal device determines whether the target audio playing device to be connected exists in response to the monitored audio event, the first terminal device is set to the first audio mode according to the monitored audio event in response to the existence of the target audio playing device to be connected, a connection with the target audio playing device is established, and the connection between the target audio playing device and the second terminal device is disconnected, the first audio mode of the first terminal device is adjusted to a second audio mode, and audio of the target audio event is sent to the target audio playing device; and an adjustment module 72 configured to control the second terminal device to switch from the earpiece playing mode to the mute playing mode in response to the currently played audio being in the earpiece playing mode.

Further, in an implementation of embodiments of the present disclosure, the apparatus further includes: a display module configured to display prompt information on an interactive interface of the second terminal device; and the prompt information is configured to indicate that the target audio playing device connected with the second terminal device has been connected with the first terminal device.

In an implementation of embodiments of the present disclosure, the apparatus further includes: acquiring module configured to acquire the earphone preemption information sent by the connected target audio playing device; and the earphone preemption information is configured to indicate that the target audio playing device is connecting with the first terminal device.

In an implementation of embodiments of the present disclosure, the adjustment module 72 is further configured to: control the second terminal device to switch from a mute playing mode to a speaker playing mode in response to detecting a target operation on the second terminal device.

It should be noted that the above explanation of the method embodiment is also applicable to the apparatus of this embodiment, which will not be repeated here.

In the apparatus for audio mode processing of embodiments of the present disclosure, in response to monitoring the first information broadcast by the first terminal device, it is determined whether the currently played audio is in the earpiece playing mode, and in response to the currently played audio being in the earpiece playing mode, the second terminal device is controlled to switch from the earpiece playing mode to the mute playing mode. In the scenario of connecting with the identical account, when the connected target audio playing device is preempted, the second terminal device of the plurality of terminal devices may judge whether it is necessary to set the second terminal device to the mute playing mode of the voice according to whether the audio is still playing at this time. This process is also automatically triggered, which reduces the manual pause or mute by the user, improves the intelligence and achieves the purpose of improving the user experience.

In order to realize the above embodiment, the present disclosure also proposes an electronic device, which includes a memory, a processor and a computer program stored in the memory and executable on the processor. When the processor executes the program, the method described in the above method embodiment is realized.

In order to realize the above-mentioned embodiment, the present disclosure also proposes a non-transitory computer-readable storage medium, on which a computer program is stored, and the computer program, when executed by a processor, realizes the method described in the above-mentioned method embodiments.

In order to realize the above-mentioned embodiments, the present disclosure also proposes a computer program product, on which a computer program is stored, and when the computer program is executed by a processor, the method described in the above-mentioned method embodiment is realized.

Figure 8:
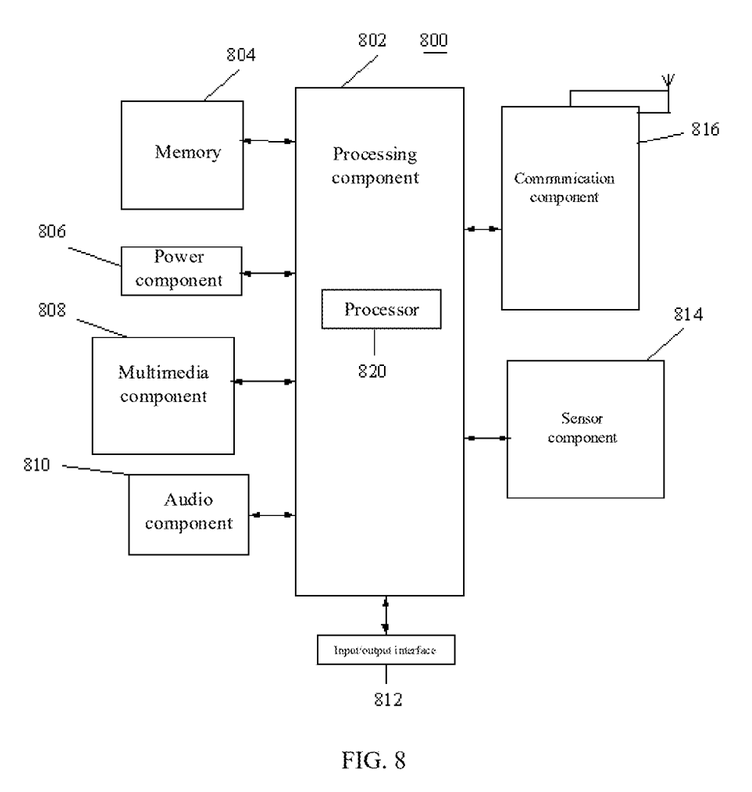
FIG. 8 is a schematic structural diagram of an electronic device provided by an embodiment of the present disclosure.

FIG. 8 is a schematic structural diagram of an electronic device provided by embodiments of the present disclosure. For example, the electronic device 800 may be a mobile phone, a computer, a digital broadcasting terminal, a message transceiving device, a game console, a tablet device, a medical device, a fitness device, a personal digital assistant and the like.

Referring to FIG. 8, the electronic device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls an overall operation of the electronic device 800, such as operations associated with display, telephone call, data communication, camera operation and recording operation. The processing component 802 may include one or more processors 820 to execute instructions to complete all or part of the steps of the method described above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of these data include instructions for any application or method operating on the electronic device 800, contact data, phone book data, messages, pictures, videos, and the like. The memory 804 may be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 806 provides power for various components of the electronic device 800. The power component 806 may include a power management system, one or more power sources, and other components associated with generating, managing and distributing power for the electronic device 800.

The multimedia component 808 includes a screen that provides an output interface between the electronic device 800 and the user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 808 includes a front camera and/or a rear camera. When the electronic device 800 is in an operation mode, such as a shooting mode or a video mode, the front camera and/or the rear camera may receive external multimedia data. Each front camera and rear camera may be a fixed optical lens system or have a focal length and optical zoom capability.

The audio component 810 is configured to output and/or input audio signals. For example, the audio component 810 includes a microphone (MIC) configured to receive external audio signals when the electronic device 800 is in an operation mode, such as a call mode, a recording mode and a voice recognition mode. The received audio signal may be further stored in the memory 804 or transmitted via the communication component 816. In some embodiments, the audio component 810 further includes a speaker for outputting audio signals.

I/O interface 812 provides an interface between processing component 802 and peripheral interface modules, which may be keyboards, click wheels, buttons, etc. These buttons may include, but are not limited to, home button, volume button, start button and lock button.

The sensor component 814 includes one or more sensors for providing state evaluation for various aspects of the electronic device 800. For example, the sensor component 814 may detect the on/off state of the electronic device 800, the relative positioning of components, such as the display and keypad of the electronic device 800. The sensor component 814 may also detect the position change of the electronic device 800 or a component of the electronic device 800, the presence or absence of contact between the user and the electronic device 800, the orientation or acceleration/deceleration of the electronic device 800 and the temperature change of the electronic device 800. The sensor component 814 may include a proximity sensor configured to detect the presence of a nearby object without any physical contact. The sensor component 814 may also include an optical sensor, such as a CMOS or CCD image sensor, for use in imaging applications. In some embodiments, the sensor component 814 may further include an acceleration sensor, a gyro sensor, a magnetic sensor, a pressure sensor or a temperature sensor.

The communication component 816 is configured to facilitate wired or wireless communication between the electronic device 800 and other devices. The electronic device 800 may access wireless networks based on communication standards, such as Wi-Fi™ 4G or 5G, or their combination. In an example embodiment, the communication component 816 receives a broadcast signal or broadcast related information from an external broadcast management system via a broadcast channel. In an example embodiment, the communication component 816 further includes a near field communication (NFC) module to facilitate short-range communication. For example, the NFC module may be implemented based on radio frequency identification (RFID) technology, infrared data association (IrDA) technology, ultra-wideband (UWB) technology, Bluetooth™ (BT) technology and other technologies.

In an exemplary embodiment, the electronic device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above-described methods.

In an example embodiment, there is also provided a non-transitory computer-readable storage medium including instructions, such as the memory 804 including instructions, which may be executed by the processor 820 of the electronic device 800 to complete the above method. For example, the non-transitory computer-readable storage medium may be ROM, random access memory (RAM), CD-ROM, magnetic tape, floppy disk, optical data storage device, etc.

In the description of this specification, descriptions referring to the terms "an embodiment", "some embodiments", "examples", "specific examples" or "some examples" mean that specific features, structures, materials or characteristics described in connection with the embodiment or example are included in at least one embodiment or example of the present disclosure. In the specification, the schematic expressions of the above terms are not necessarily aimed at the same embodiment or example. Moreover, the specific features, structures, materials or characteristics described may be combined in any one or more embodiments or examples in a suitable manner. In addition, those skilled in the art may combine and combine different embodiments or examples and features of different embodiments or examples described in this specification without contradicting each other.

In addition, the terms "first" and "second" are only used for descriptive purposes, and cannot be understood as indicating or implying relative importance or implicitly indicating the number of indicated technical features. Therefore, the features defined as "first" and "second" may explicitly or implicitly include at least one of these features. In the description of the present disclosure, "plurality of" means at least two, such as two, three, etc., unless otherwise specifically defined.

Any process or method description in the flow chart or otherwise described herein may be understood as representing a module, segment or part of code that includes one or more executable instructions for implementing customized logic functions or steps of the process, and the scope of preferred embodiments of the present disclosure includes other implementations, in which functions may be performed out of the order shown or discussed, including in a substantially simultaneous manner or in the reverse order according to the functions involved, which should be understood by those skilled in the technical field to which embodiments of the present disclosure belong.

The logic and/or steps represented in the flow chart or described in other ways herein, for example, may be regarded as a sequenced list of executable instructions for realizing logical functions, and may be embodied in any computer-readable medium for use by or in combination with an instruction execution system, apparatus or device (such as a computer-based system, a system including a processor or other systems that may obtain instructions from and execute instructions from the instruction execution system, apparatus or device). For the purposes of this specification, a "computer-readable medium" may be any apparatus that may contain, store, communicate, propagate or transmit a program for use by or in combination with an instruction execution system, apparatus or device. More specific examples (non-exhaustive list) of computer-readable media include the following: electrical connection part (electronic apparatus) with one or more wires, portable computer disk box (magnetic apparatus), random access memory (RAM), read-only memory (ROM), erasable and editable read-only memory (EPROM or flash memory), optical fiber apparatus, and portable CD-read only memory (CDROM). In addition, the computer-readable medium may even be paper or other suitable medium on which the program may be printed, because the program may be obtained electronically by, for example, optically scanning the paper or other medium, followed by editing, interpreting or processing in other suitable ways if necessary, and then stored in a computer memory.

It should be understood that various parts of the present disclosure may be implemented in hardware, software, firmware or a combination thereof. In the above embodiments, a plurality of steps or methods may be realized by software or firmware stored in a memory and executed by an appropriate instruction execution system. For example, if it is implemented by hardware, as in another embodiment, it may be implemented by any one of the following technologies known in the art or their combination: discrete logic circuits with logic gates for implementing logic functions on data signals, specific integrated circuits with appropriate combinational logic gates, programmable gate arrays (PGA), field programmable gate arrays (FPGA), etc.

Embodiments of one aspect of the present disclosure propose a method for audio processing, which is applicable to a first terminal device and includes: determining whether a target audio playing device to be connected exists in response to a monitored audio event, in which the target audio playing device has a connection with a second terminal device, and the second terminal device and the first terminal device have identical account information; setting the first terminal device to a first audio mode according to the monitored audio event in response to an existence of a target audio playing device to be connected; establishing a connection with the target audio playing device, and disconnecting the connection between the target audio playing device and the second terminal device; and adjusting the first audio mode of the first terminal device to a second audio mode, and sending audio of the target audio event to the target audio playing device.

Embodiments of one aspect of the present disclosure propose a method for audio processing, which is applicable to a second terminal device and includes: determining whether currently played audio is in an earpiece playing mode in response to monitoring a first information broadcast by a the first terminal device; in which the first information is configured to indicate that a target audio playing device connected with the second terminal device is connected with the first terminal device, and the second terminal device and the first terminal device have identical account information; in which the first information is broadcast by the first terminal device in a condition that the first terminal device determines whether the target audio playing device to be connected exists in response to a monitored audio event, in response to an existence of the target audio playing device to be connected, the first terminal device is set to a first audio mode according to the monitored audio event, a connection is established with the target audio playing device, and the connection between the target audio playing device and the second terminal device is disconnected, and the first audio mode of the first terminal device is adjusted to a second audio mode, and audio of the target audio event is sent to the target audio playing device; and controlling the second terminal device to switch from the earpiece playing mode to a mute playing mode in response to the currently played audio being in the earpiece playing mode.

Embodiments of another aspect of the present disclosure propose an apparatus for audio mode processing, which is applicable to a first terminal device, and includes: a determination module configured to determine whether a target audio playing device to be connected exists in response to a monitored audio event, in which the target audio playing device has a connection with a second terminal device, and the second terminal device and the first terminal device have identical account information; a setting module configured to set the first terminal device to a first audio mode according to the monitored audio event in response to an existence of the target audio playing device to be connected; an establishment module configured to establish a connection with the target audio playing device and disconnect the connection between the target audio playing device and the second terminal device; and an adjustment module configured to adjust the first audio mode of the first terminal device to a second audio mode, and send audio of the target audio event to the target audio playing device.

Embodiments of another aspect of the present disclosure propose an apparatus for audio processing, which is applicable to the second terminal device, and includes: a determination module configured to determine whether currently played audio is in an earpiece playing mode in response to monitoring a first information broadcast by a first terminal device, in which the first information is configured to indicate that the target audio playing device connected with the second terminal device is connected with the first terminal device, and the second terminal device and the first terminal device have identical account information; in which the first information is broadcast by the first terminal device in a condition that the first terminal device determines whether the target audio playing device to be connected exists in response to a monitored audio event, in response to an existence of the target audio playing device to be connected, the first terminal device is set to a first audio mode according to the monitored audio event, a connection is established with the target audio playing device, and the connection between the target audio playing device and the second terminal device is disconnected, and the first audio mode of the first terminal device is adjusted to a second audio mode, and audio of the target audio event is sent to the target audio playing device; and an adjustment module configured to control the second terminal device to switch from the earpiece playing mode to a mute playing mode in response to the currently played audio being in the earpiece playing mode.

Embodiments of another aspect of the present disclosure propose an electronic device, which includes a memory, a processor and a computer program stored on the memory and executable on the processor. The program, when executed by the processor, realizes a method described in the one aspect or a method described in the another aspect.

Embodiments of another aspect of the present disclosure propose a non-transitory computer-readable storage medium, on which a computer program is stored, and the computer program, when executed by a processor, realizes a method described in the one aspect or a method described in the another aspect.

Embodiments of another aspect of the present disclosure propose a computer program product, on which a computer program is stored, the program, when executed by a processor, realizes a method described in the one aspect or a method described in the another aspect.

Those skilled in the art may understand that all or part of the steps carried by the method of the above embodiment may be completed by instructing related hardware through a program, which may be stored in a computer-readable storage medium, and the program, when executed, includes one or a combination of the steps of the method embodiment.

In addition, each functional unit in each embodiment of the present disclosure may be integrated in one processing module, or each unit may exist physically alone, or two or more units may be integrated in one module. The above integrated modules may be realized in the form of hardware or software functional modules. The integrated module may also be stored in a computer-readable storage medium if it is implemented in the form of a software functional module and sold or used as an independent product.

The storage medium mentioned above may be read-only memory, magnetic disk or optical disk, etc. Although the embodiments of the present disclosure have been shown and described above, it may be understood that the above embodiments are exemplary and cannot be understood as limitations of the present disclosure, and those skilled in the art may make changes, modifications, substitutions and variations to the above embodiments within the scope of the present disclosure.

What is claimed is:

1. A method for audio processing, comprising:
   determining whether a target audio playing device to be connected exists in response to a monitored audio event, wherein a first terminal device and a second terminal device have identical account information, and the target audio playing device has a connection with the second terminal device;

in response to an existence of the target audio playing device to be connected, setting, according to the monitored audio event, the first terminal device to a first audio mode;

establishing a connection with the target audio playing device, and disconnecting the connection between the target audio playing device and the second terminal device;

adjusting the first audio mode of the first terminal device to a second audio mode, sending audio of the target audio event to the target audio playing device, and broadcasting first information after adjusting the first audio mode of the first terminal device to the second audio mode and sending the audio of the target audio event to the target audio playing device, wherein the first information is broadcast by the first terminal device in a condition that the first terminal device determines whether the target audio playing device to be connected exists in response to the monitored audio event, wherein the second terminal device determines whether currently played audio is in an earpiece playing mode in response to monitoring the first information broadcast by the first terminal device, wherein the first information is configured to indicate that the target audio playing device connected with the second terminal device establishes a connection with the first terminal device, and switches from the earpiece playing mode to a mute playing mode in response to the currently played audio being in the earpiece playing mode;

wherein after the second terminal device switches from the earpiece playing mode to the mute playing mode in response to the currently played audio being in the earpiece playing mode, the second terminal device displays prompt information on an interactive interface of the second terminal device, wherein the prompt information is configured to indicate that the target audio playing device connected with the second terminal device has been connected with the first terminal device.

2. The method according to claim 1, wherein determining whether a target audio playing device to be connected exists comprises:
   acquiring state information of at least one audio playing device to be screened;
   determining whether an audio playing device meeting a condition of audio switching exists, according to the state information of each audio playing device and priority of the audio event;
   in response to an existence of the audio playing device meeting the condition of audio switching, determining the target audio playing device from the audio playing device meeting the condition of audio switching; and
   in response to an absence of the audio playing device meeting the condition of audio switching, determining that no target audio playing device to be connected exists.

3. The method according to claim 2, wherein acquiring the state information of at least one audio playing device to be screened comprises:
   searching to obtain broadcast information of the at least one audio playing device, and parsing to obtain current state information of at least one candidate audio playing device.

4. The method according to claim 2, wherein acquiring the state information of at least one audio playing device to be screened comprises:
   acquiring current state information of the at least one audio playing device stored in a setting list.

5. The method according to claim 1, wherein an audio type corresponding to the audio event is a call type, and adjusting the first audio mode of the first terminal device to the second audio mode comprises:
   adjusting a speaker playing mode corresponding to the first terminal device to an earpiece playing mode.

6. The method according to claim 1, wherein an audio type corresponding to the audio event is a multimedia type, and adjusting the first audio mode of the first terminal device to the second audio mode comprises:
   adjusting a mute playing mode corresponding to the first terminal device to an earpiece playing mode.

7. The method according to claim 1, further comprising:
   displaying prompt information on an interactive interface of the first terminal device; wherein the prompt information is configured to indicate a connection state of the first terminal device and the target audio playing device.

8. The method according to claim 1, wherein establishing a connection with the target audio playing device comprises:
   in response to detecting that the first terminal device is not paired with the target audio playing device, pairing and connecting with the target audio playing device.

9. An electronic device, comprising a memory, a processor and a computer program stored on the memory and executable on the processor, wherein the program, when executed by the processor, realizes a method according to claim 1.

10. A non-transitory computer-readable storage medium, having a computer program stored thereon, wherein the computer program, when executed by a processor, realizes a method according to claim 1.

11. A method for audio processing, comprising:
    determining whether currently played audio is in an earpiece playing mode in response to monitoring first information broadcast by a first terminal device; wherein the first information is configured to indicate that a target audio playing device connected with a second terminal device establishes a connection with the first terminal device, and the second terminal device and the first terminal device have identical account information; wherein the first information is broadcast by the first terminal device in a condition that the first terminal device determines whether the target audio playing device to be connected exists in response to a monitored audio event; in response to the existence of the target audio playing device to be connected, the first terminal device is set to a first audio mode according to the monitored audio event; a connection is established with the target audio playing device, and the connection between the target audio playing device and the second terminal device is disconnected; and the first audio mode of the first terminal device is adjusted to a second audio mode, and audio of the target audio event is sent to the target audio playing device; and
    switching from the earpiece playing mode to a mute playing mode in response to the currently played audio being in the earpiece playing mode;
    wherein after switching from the earpiece playing mode to the mute playing mode in response to the currently played audio being in the earpiece playing mode, the method further comprises:

displaying prompt information on an interactive interface of the second terminal device; wherein the prompt information is configured to indicate that the target audio playing device connected with the second terminal device has been connected with the first terminal device.

12. The method according to claim 11, wherein prior to determining whether the currently played audio is in the earpiece playing mode in response to monitoring the first information broadcast by the first terminal device, the method further comprises:
acquiring earphone preemption information sent by the connected target audio playing device; wherein the earphone preemption information is configured to indicate that the target audio playing device is connecting with the first terminal device.

13. The method according to claim 11, wherein after switching from the earpiece playing mode to the mute playing mode in response to the currently played audio being in the earpiece playing mode, the method further comprises:
switching from the mute playing mode to a speaker playing mode in response to detecting a target operation on the second terminal device.

14. An electronic device, comprising a memory, a processor and a computer program stored on the memory and executable on the processor, wherein the program, when executed by the processor, realizes a method according to claim 11.

15. A non-transitory computer-readable storage medium, having a computer program stored thereon, wherein the computer program, when executed by a processor, realizes a method according to claim 11.

16. An apparatus for audio processing, comprising:
a determination module configured to determine whether a target audio playing device to be connected exists in response to a monitored audio event, wherein a first terminal device and a second terminal device have identical account information, and the target audio playing device has a connection with a second terminal device;
a setting module configured to set the first terminal device to a first audio mode according to the monitored audio event in response to an existence of the target audio playing device to be connected;
an establishment module configured to establish a connection with the target audio playing device and disconnect the connection between the target audio playing device and the second terminal device;
an adjustment module configured to adjust the first audio mode of the first terminal device to a second audio mode, and send audio of the target audio event to the target audio playing device; and
a broadcasting module configured to broadcast first information;
wherein the broadcasting module is configured to broadcast the first information after the adjustment module adjusts the first audio mode of the first terminal device to the second audio mode and sends the audio of the target audio event to the target audio playing device, wherein the first information is broadcast by the broadcasting module in a condition that the first terminal device determines whether the target audio playing device to be connected exists in response to the monitored audio event,
wherein the second terminal device is configured to determine whether currently played audio is in an earpiece playing mode in response to monitoring the first information broadcast by the broadcasting module, wherein the first information is configured to indicate that the target audio playing device connected with the second terminal device establishes the connection with the first terminal device, and to switch from the earpiece playing mode to a mute playing mode in response to the currently played audio being in the earpiece playing mode, and
wherein after the second terminal device switches from the earpiece playing mode to the mute playing mode in response to the currently played audio being in the earpiece playing mode, the second terminal device is configured to display prompt information on an interactive interface of the second terminal device, wherein the prompt information is configured to indicate that the target audio playing device connected with the second terminal device has been connected with the first terminal device.

17. The apparatus according to claim 16, wherein the determination module is further configured to:
acquire state information of at least one audio playing device to be screened;
determine whether an audio playing device meeting a condition of audio switching exists according to the state information of each audio playing device and priority of the audio event;
determine the target audio playing device from the audio playing device meeting the condition of audio switching in response to an existence of the audio playing device meeting the condition of audio switching; and
determine that no target audio playing device to be connected exists in response to an absence of the audio playing device meeting the condition of audio switching.

18. The apparatus according to claim 17, wherein the determination module is further configured to search to obtain broadcast information of the at least one audio playing device, and parse current state information of the at least one candidate audio playing device.

* * * * *